United States Patent
Gregorius et al.

(10) Patent No.: US 7,450,649 B2
(45) Date of Patent: Nov. 11, 2008

(54) CURRENT MODE DIGITAL DATA TRANSMITTER

(75) Inventors: Peter Gregorius, München (DE); Armin Hanneberg, Haar (DE)

(73) Assignee: Infineon Technologies AG, Munich (DE)

( * ) Notice: Subject to any disclaimer, the term of this patent is extended or adjusted under 35 U.S.C. 154(b) by 607 days.

(21) Appl. No.: 10/481,856

(22) PCT Filed: May 15, 2003

(86) PCT No.: PCT/EP02/05355

§ 371 (c)(1),
(2), (4) Date: Dec. 22, 2003

(87) PCT Pub. No.: WO02/096050

PCT Pub. Date: Nov. 28, 2002

(65) Prior Publication Data

US 2004/0184558 A1    Sep. 23, 2004

(30) Foreign Application Priority Data

May 22, 2001 (DE) ................ 101 25 023

(51) Int. Cl.
*H04B 3/00*    (2006.01)
(52) U.S. Cl. .................... 375/257; 379/399.01
(58) Field of Classification Search ........ 375/257, 375/295; 379/399.01
See application file for complete search history.

(56) References Cited

U.S. PATENT DOCUMENTS

| 3,946,303 A | * | 3/1976 | Streit et al. ............ 323/280 |
| 5,504,782 A | | 4/1996 | Campbell, Jr. |
| 6,154,784 A | * | 11/2000 | Liu ............... 709/250 |
| 6,282,042 B1 | * | 8/2001 | Hana et al. ............ 360/64 |
| 6,577,197 B1 | * | 6/2003 | Morrish ............ 330/292 |

FOREIGN PATENT DOCUMENTS

EP    0 963 083 A2    12/1999
GB    2 354 125 A    3/2001

OTHER PUBLICATIONS

Bouras, S., T. Georgantas, Y. Papananos, and D. Dervenis, "Current Mode Baseband Interface for Communication Applications," National Technical University of Athens, © 1999, (4 pages).

* cited by examiner

Primary Examiner—Kevin M Burd
(74) Attorney, Agent, or Firm—Maginot, Moore & Beck (57) ABSTRACT

The invention relates to a transmitter for transmission of digital data via a transmission line (10), comprising a current-driving digital/analogue converter (1) which is arranged at the input of the transmitter; a current-operated form filter (2) for forming the current pulses which are supplied from the digital/analogue converter; a line driver (5) which carries out current/voltage conversion; and a circuit for offset compensation (6), which is arranged in a feedback path (11). In order to improve the quality of the pulses which are transmitted at the output of the transmitter, the invention proposes that the internal signal processing of the transmitter be carried out on a current basis.

25 Claims, 4 Drawing Sheets

CURRENT MODE DIGITAL DATA TRANSMITTER

FIELD OF THE INVENTION

The invention relates to a transmitter for transmission of digital data via a transmission line, which is used in particular in telecommunications systems.

BACKGROUND

In order to ensure error-free data transmission, the pulse form at the output of a transmitter (Line Interface Unit) must comply with specific specifications (see CCITT G.703 Physical/Electrical Characteristics of Hierarchical Digital Interfaces). Appropriate standard pulse masks, which the transmitters have to comply with, are specified as a function of the data rate and of the chosen Standard.

Transmitters which have been developed to date have been able to satisfy the specified Standards satisfactorily only when sufficient operating voltage was available. The concept of such known line interface units is predominantly based on voltage-processing principles in the signal path of the transmitters, which may have resulted in certain fluctuation in the operating points in the corresponding circuits, and entailing restricted-quality operation of the overall transmitter. Furthermore, these principles are only inadequately suitable for modern deep submicron CMOS processes and the withstand voltage, which is restricted as a consequence of this, of regular MOS transistors.

Furthermore, the circuits of known transmitters have relatively high-value mode impedances, which in turn result in severe thermal noise and thus have a limited signal-to-noise ratio. Apart from this, the known transmitters were sensitive to offset voltages, which cause an undesirable direct current via the load at the output. In particular, the prior saturation of a downstream transformer can lead to additional undesirable distortion of the signal.

A range of publications exists in which voltage-processing transmitters are described. These include, for example:

H. Herrman and R. Koch: "A 1.544 Mb/s CMOS Line Driver for 22.8Ω Load", IEEE Journal of Solid-State Circuits, June 1990, Pages 760 etc., Haideh Khorramabadi: "Highly Efficient CMOS Line Drive with 80 dB Linearity for ISDN U-Interface Applications", IEEE Journal of Solid-State Circuits, December 1992, Pages 1723 etc., and M. Moyal, M. Gröbel and Th. Blon: "A 25 kft, 768 kb/s CMOS Analog Front End for Multible-Bit-Rate DSL Transceiver", IEEE Journal of Solid-State Circuits, December 1999, Pages 1961 etc., and the references cited in these documents. The known solutions, however, are subject to all of the disadvantages that have been mentioned above.

The object of the present invention is thus to provide a transmitter for transmission of digital data, which allows the generation of pulses of considerably higher quality and accuracy, and which avoids the disadvantages of voltage-processing principles for signal generation.

SUMMARY

The major idea of the invention is for the internal signal processing in the transmitter to be carried out on a current basis; this type of signal processing is referred to in the specialist literature as the current-mode approach. Only the interface to the "outside world" is preferably provided by transistors that are more resistant to voltage in order to drive the signals to the load or to the cable.

Furthermore, the invention avoids the need to provide feedback loops in the signal path, for example in the filter and in the current amplifiers, of the transmitter.

Feedback loops can have a negative influence on the stability of the transmitter.

The transmitter according to the invention for transmission of digital data via a transmission line thus comprises at least the following current-operated circuits without feedback loops, namely:

a current-driving digital/analogue converter which forms the input of the transmitter;

a current-operated form filter for forming (smoothing) the quantized current pulses which are supplied from the digital/analogue converter;

a line driver which carries out current/voltage conversion and forms the output of the transmitter; and a circuit for offset compensation.

Furthermore, a level shifter can be provided for conversion of a lower supply voltage to a higher supply voltage;

A current-operated amplifier or buffer is preferably arranged at the output of the digital/analogue converter, for isolation of the converted output.

The current-operated amplifier initially divides the amplitudes of the pulses which are supplied from the digital/analogue converter by a specific factor N. The expression amplifier is in the following text also intended to include amplifiers which operate with a step-down ratio, that is to say which divide the current.

The current-operated amplifier essentially forms a current-controlled current source and, according to one preferred embodiment, comprises a current mirror.

According to one refinement of the invention, the current-operated form filter comprises a current-operated low-pass filter for forming the data pulses, and which preferably likewise has a current mirror. The current-operated form filter produces desired pre-emphasis, depending on the chosen Standard and/or application, of the transmission pulses which are emitted at the transmitter output, and is at the same time used as a form filter for the DA current pulses.

According to one preferred refinement of the invention, the cut-off frequency of the low-pass filter is switchable.

A current-controlled current amplifier is preferably provided downstream from the form filter in the signal path of the transmitter, and may likewise be formed from a current mirror circuit.

According to one preferred refinement of the invention, a current-controlled level shifter is also provided in the signal path of the transmitter and allows the part of the circuit located upstream of it to be operated with a lower supply voltage. The level shifter is preferably likewise formed with a current mirror.

According to one preferred refinement of the invention, the current mirrors which are used in the transmitter are equipped with voltage regulation, which essentially stabilizes the node potential at the input and/or at the output of the current mirror. The voltage level at this node is thus virtually constant, and additional distortion caused by a shift in the operating point and/or charge-shifting effects due to parasitic capacitances is reduced. The voltage regulation thus results in the circuit always being at the optimum operating point.

The offset-compensation circuit which is arranged in a feedback path is preferably formed by means of transconductance stages. The offset compensation should have a low-pass filter characteristic in order that the pulse that is produced at the output may comply with the Standards. In the forward direction, the low-pass filter with its pole point acts as a high-pass filter with a zero point in the overall transfer function of the transmitter. During design, care must be taken to ensure that the effective zero point in the forward direction is lower than the smallest spectral components of the transmission pulse.

The transmitter preferably uses differential path technology.

The invention will be explained in more detail in the following text using the figures, by way of example, in which:

DETAILED DESCRIPTION

Figure 1:
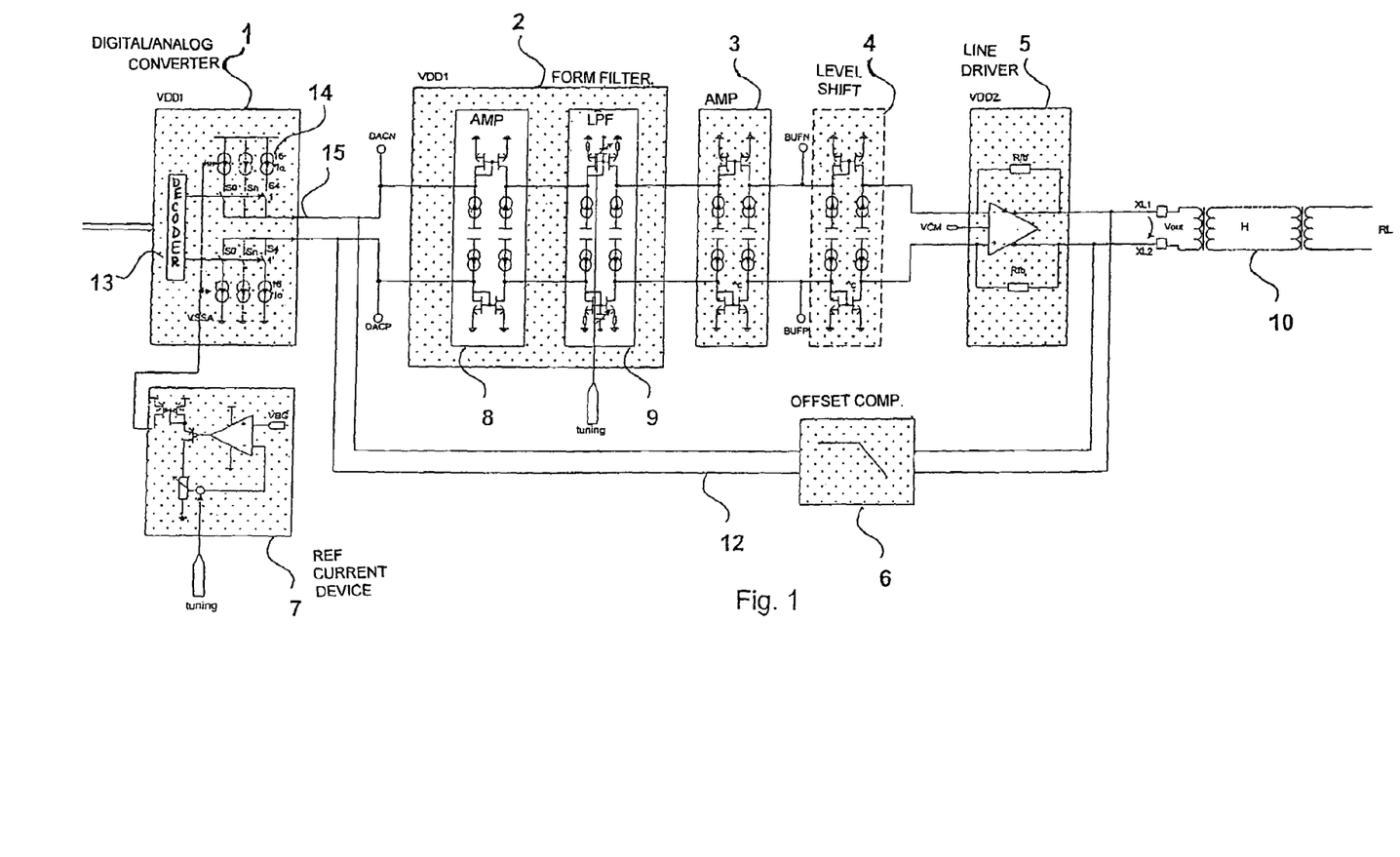
FIG. 1: shows an exemplary embodiment of a transmitter which is based on current processing and uses differential path technology.

FIG. 1 shows a schematic block diagram of a transmitter comprising a digital/analogue converter 1, a form filter 2, a current amplifier 3, a level shifter 4, and a line driver 5. The elements 1-5 form the signal path of the transmitter.

A circuit for offset compensation 6, with a low-pass filter characteristic, is provided in the feedback path 12 of the transmitter.

A reference current production device 7 provides a reference current, which is supplied to all the units 1-6. All the pulse currents as well as the currents for setting the operating point are thus derived from the reference current, thus avoiding undesirable offsets resulting from lack of synchronization. It is also feasible for the various components of the transmitter to be supplied with intrinsically independent currents. This must be decided on the basis of the requirements of bandwidths, linearity, etc.

The reference current can additionally be adjusted in order to increase the accuracy of the pulse amplitude of the transmission pulses, and thus to guarantee compliance of specific pulse masks with various Standards.

The digital/analogue converter 1 forms the input of the transmitter, and is in the form of a current-driving digital/analogue converter. The digital data which is supplied at the input is decoded in a decoder 13, in order in this way to switch weighted current sources 14. Internal regulation (not shown) ensures matching of the PNOS and NMOS current mirrors within the digital/analogue converter.

Differential current pulses are produced at the outputs 15 of the D/A converter (comprising a DACP and a DACN), and are supplied to a current-controlled form filter 2.

The form filter 2 comprises a current divider 8 and a low-pass filter 9, which provides desired pre-emphasis of the transmission pulses which are emitted at the output of the transmitter, and is at the same time used as a form filter for the DA current pulses. The current amplifier is in this case in the form of a divider 8, which divides the amplitude of the arriving current pulses by a specific factor N. In this case, this is carried out only by way of example in order to reduce the power consumption or the surface area required for the downstream low-pass filter. It is also feasible for the signal current not be attenuated but to be amplified. The amplifier or divider stage 8 should in any case be designed to provide decoupling between the DA converter 1 and the filter 9.

Figure 2:
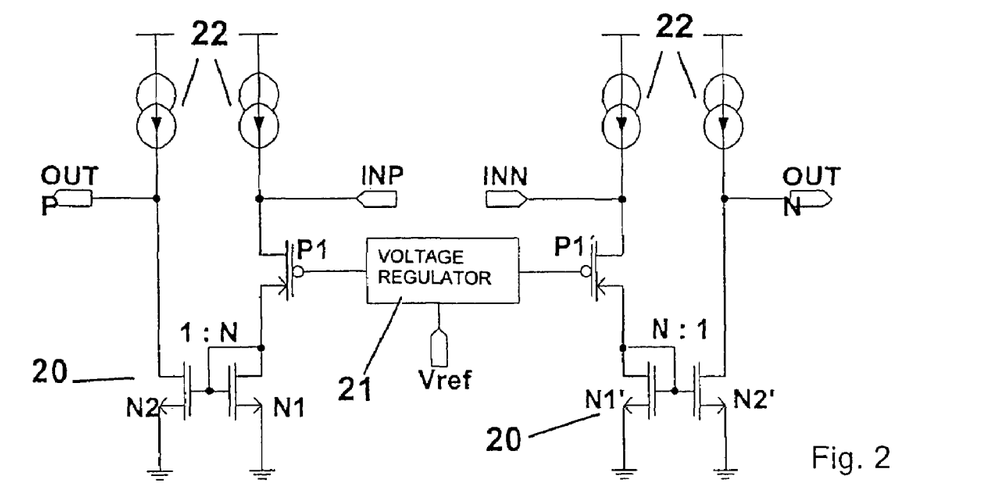
FIG. 2 shows a current amplifier using differential path technology, according to one refinement of the invention.

The transmission characteristics of the current amplifier shown in FIG. 2 in the frequency domain is given, in a simplified form, by the following equation:

$$A_{iv}(s) = \frac{i_{out}(s)}{i_{in}(s)} \equiv \frac{gm_{N1}}{gm_{N2}} * \left(\frac{1}{1 + s * \frac{C_{N1}}{gm_{N1}}}\right) \equiv \frac{gm_{N1}}{gm_{N2}} * \left(\frac{1}{1 + \frac{s}{\omega_{iv}}}\right) \quad [1.1]$$

where
gmN1 is the gradient of the transistor N1,
gmN2 is the gradient of the transistor N2,
CN1 is the sum of the capacitances at the gate of the transistor N1, and
ω is the pole frequency of the parasitic pole of the mirror.

Figure 3:
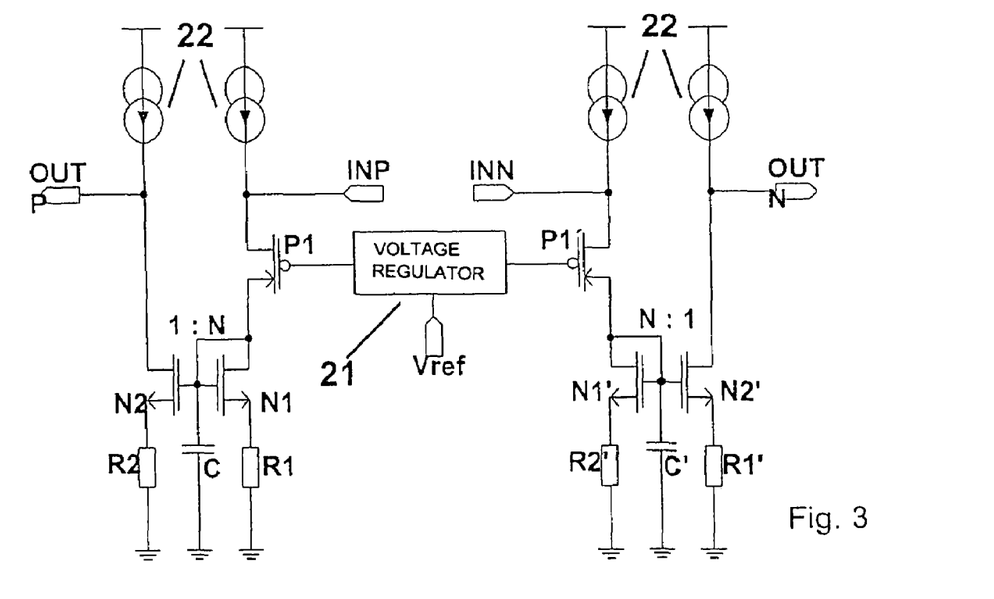
FIG. 3 shows one embodiment of a current filter.

The subsequent low-pass filter 9 provides the desired signal forming and pre-emphasis, and preferably operates on the principle of GmC filtering. The transmission characteristic of the form-filter shown in FIG. 3 in the frequency domain is given by the following equation, $$A_{tp}(s) = \frac{i_{out}(s)}{i_{in}(s)} \equiv \frac{R1}{R2} * \left(\frac{1 + \frac{1}{gm_{N1} * R1}}{1 + \frac{1}{gm_{N2} * R2}}\right)\left(\frac{1}{1 + \frac{s * C_{N1}}{(gm_{N1} + R1)}}\right)$$

$$\cong \frac{R1}{R2} * \left(\frac{1 + \frac{1}{gm_{N1} * R1}}{1 + \frac{1}{gm_{N2} * R2}}\right)\left(\frac{1}{1 + \frac{s}{\omega_{ip}}}\right) \quad [1.2]$$

where
gmN1 is the gradient of the transistor N1,
gmN2 is the gradient of the transistor N2,
R1 is the degeneration resistance of the transistor N1,
R2 is the degeneration resistance of the transistor N2,
CN1 is the sum of the capacitances of the gate of the transistor N1, and
ω is the pole frequency of the dominant pole of the mirror.

The pre-emphasized current pulses are amplified by a specific factor N in the current amplifier 3. The transfer function within the frequency domain is given by equation 1.1. The implementation of the current amplifier corresponds to FIG. 2. The factor N is given by:

$$N = \frac{i_{out}}{i_{in}} \cong \frac{gm_{N1}}{gm_{N2}} \quad [1.3]$$

where
gmN1 is the gradient of the transistor N1,
gmN2 is the gradient of the transistor N2.

A level shifter 4 is optionally connected to the output of the current amplifier 3, transforms the supply voltage from a low supply voltage VDD1 to a higher supply voltage VDD2 and allows the circuit part which is located upstream of it to be operated with a lower supply voltage VDD1. This has the major advantage that it is possible to use transistors with a thinner gate oxide based on modern sub-micron technologies for the signal path. This is in turn evident in a higher speed and in a lower current consumption.

The line driver 6 comprises an operational amplifier (OPV) with feedback resistors Rfb, by means of which the current pulses are converted to voltage pulses, as required for transmission. This configuration is generally referred to as shunt-shunt feedback. The transfer function for the frequency domain is thus given by:

$$A_{ir}(s) = R_{fb} * \frac{1}{1 + T_{loop}(s)} \quad [1.4]$$

$$= R_{fb} * \frac{1}{1 + \frac{R_{fb} * R_L}{R_{fb} + R_L + R_{OPV} * R_{fb} + R_{OPV} * R_L} * A_{OPA}(s) * \frac{R_{IOPA}}{R_{IOPA} + R_{fb}}} \quad [\Omega]$$

where
Tloop(s) is the open loop gain,
RL is the load resistance of the output of the current/voltage converter,
ROOPV is the output resistance of the OPV,
RIOPA is the input resistance of the OPV, and
AOPA(s) is the open gain in the frequency domain of the OPV.
The unit for the transfer function is Ohm [Ω].
The transmission line 10 is terminated in a known manner by a line resistance RL.

The offset compensation circuit 6 compensates for any DC offset between the outputs of the line drivers XL1 and XL2. This circuit 6 is preferably formed from transconductance stages, and is fed back to the output 15 of the digital/analogue converter. As a guideline for the design of the offset compensation 6, the pole frequency should be below the lowest spectral component of the transmission pulses, and should have a corresponding low-pass filter characteristic.

Figure 7:
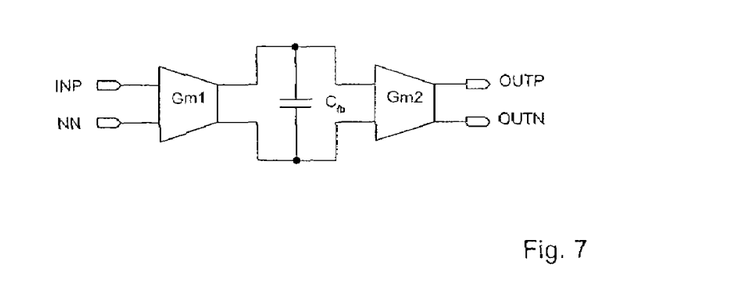
FIG. 7 shows a first exemplary embodiment of a feedback circuit for offset compensation.

The transmission characteristic of the offset compensation circuit shown in FIG. 7 in the frequency domain is given, in simplified form, by:

$$A_{fb}(s) = \frac{i_{rfb}(s)}{v_{out}(s)} \equiv Gm1 * R_{oGm1} * Gm2 * \left(\frac{1}{1 + s * \frac{C_{fb}}{Gm1 + R_{oGm1}}}\right) \cong \quad [1.5]$$

$$G_{ofb} * \left(\frac{1}{1 + \frac{s}{\omega_{fb}}}\right) \left[\frac{1}{\Omega}\right]$$

where
Gm1 is the gradient of the transconductance stage 1,
Gm2 is the gradient of the transconductance stage 2,
ROGm1 is the output resistance of the transconductance stage Gm1,
Cfb is the sum of the capacitors of the output of the transconductance Gm1,
ωfb is the pole frequency of the dominant pole of the offset compensation, and
G0fb is the total transconductance of the feedback.

FIG. 2 shows a simplified structure of a current amplifier 8 using differential path technology with mid-voltage regulation (Common Mode Feedback). The differential inputs of the current amplifier or divider are denoted INP and INN (P: Positive, N: Negative), and the corresponding outputs are denoted OUTP and OUTN.

Each differential path comprises a current mirror 20 with mirror transistors N1, N2 and N1', N2'. Appropriate choice of the mirror ratio N of the current mirror transistors N1, N2 and N1' and N2' makes it possible to either amplify the input current by the factor N (N>1) or to divide it by the factor N (N≦1). If N=1, this results in a current buffer. The transfer function in equation 1.1 applies in the frequency domain to the current divider 8 shown in FIG. 1. The staging ratio is given by:

$$N = \frac{i_{out}}{i_{in}} \cong \frac{gm_{N1}}{gm_{N2}} \quad [1.6]$$

where
gmN1 is the gradient of the transistor N1, and
gmN1 is the gradient of the transistor N2.

In order to increase the output resistance of the current mirror 20, it is also possible to use an additional cascode transistor or a regulated cascode (not shown). The expression "current mirror" in this description is intended to mean all possible versions. The description of the figures is restricted to the simplest form of current mirrors only in order to explain the operation.

Mirror transistors N1, N2 and N1' and N2' are each connected to a current source 22, which supplies a current that is derived from the reference current $I_{Ref}$.

The inputs INP, INN of the current amplifier are clamped at a predetermined potential by DC voltage regulation 21. The DC voltage regulation keeps the operating point of the current mirror 20 in a range which is as ideal as possible. The DC voltage regulation comprises a transistor P1 or P1', which is connected between the respective differential input INP, INN and the respective mirror transistor N1, N1'.

FIG. 3 shows a current filter which is physically virtually identical to the current amplifier 8 shown in FIG. 2. The current or form filter likewise comprises current mirrors 20 with mirror transistors N1, N2 and N1', N2'. The transistors P1 and P1' regulate the input voltage at the nodes INP, INN.

Degeneration resistors R1, R2 and R1', R2', respectively, which increase the linear drive range, are connected to the source connections of the respective transistors N1, N2 and N1', N2'. The filtered response results from the sum of the degeneration resistance R1 (R1) and the reciprocal of the conductance of the transistor N1 (N1') in parallel with the capacitance C (C') which is connected to ground at the mirror point of the transistors N1, N2 and N1', N2' respectively. The product of the resistance value and capacitance is proportional to the pole frequency of the filter.

It should be noted that the transistors N2 and N2' form a parasitic pole by the diffusion capacitance at the drain connection, and this must be taken into account in the transmission characteristic.

Figure 4:
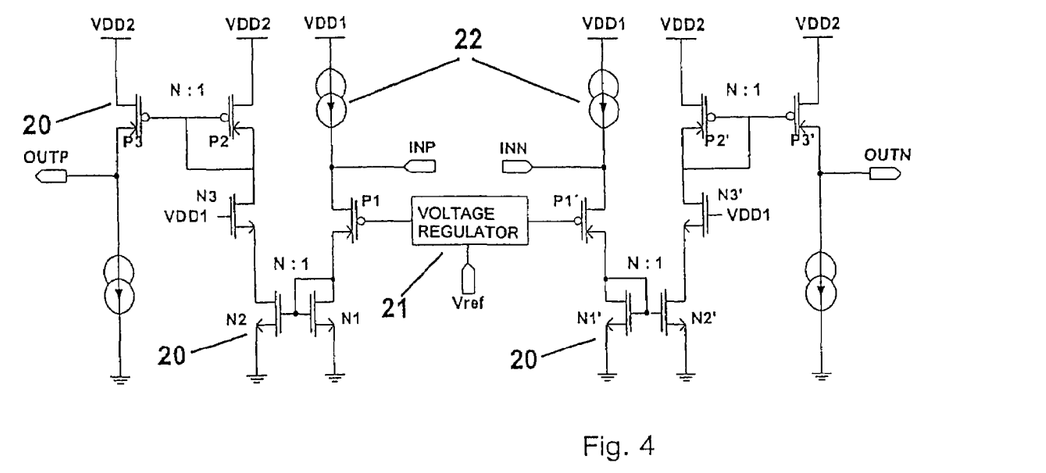
FIG. 4 shows a level shifter, formed from current mirrors, according to one embodiment of the invention.

FIG. 4 shows a level shifter 4, which is likewise formed from current mirrors 20. The level shifter 4 is used for matching the different supply voltages VDD1, VDD2 to the components in the signal path. The transistors N1, N1' and N2, N2' respectively form a current mirror, in the same way as the transistors P2, P2' and P3, P3'. A cascode transistor N3 (N3')

is provided at the drain connection of the transistor N2, and must be suitable for a higher operating voltage.

The potential of the input INP, INN of this stage, and hence also the potential of the output of the previous stage, are stabilized by DC voltage regulation 21.

Figure 5:
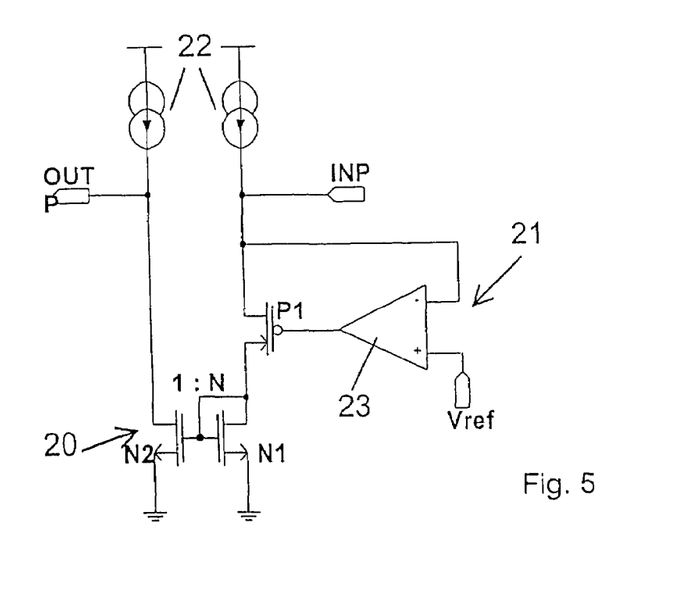
FIG. 5 shows a first exemplary embodiment of a voltage regulator for a current mirror.

FIG. 5 shows one possible implementation of DC voltage regulation 21 with an operational amplifier 21, whose inverted input is connected to the signal input of the stage, and whose non-inverted input is connected to a reference voltage. The output of the operation amplifier 23 is connected to the gate connection of the transistor P1.

Figure 6:
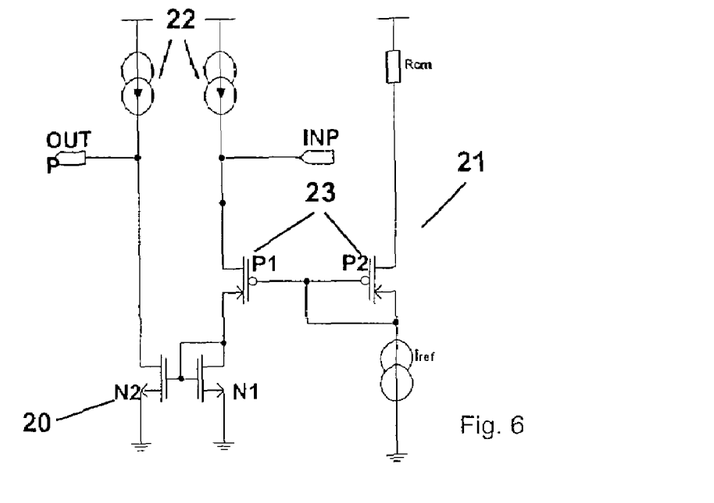
FIG. 6 shows a further exemplary embodiment of a voltage regulator for a current mirror.

FIG. 6 shows another implementation of the voltage regulation 21. The voltage regulation 21 comprises a current mirror 23 which is formed from the transistors P4 and P5. A resistor $R_{CM}$ is provided at the source connection of the transistor P5. A current source $I_O$ is connected to the source connection of the transistor P4. The drain connection of the transistor P5 is connected to a reference current source $I_{REF}$. The transistor P4 is connected to a current mirror 20 in one of the stages 2-4 described above. This circuitry results in a constant potential $U_0$ at the input. The voltage regulation can also be provided at the output of one of the stages 2-4.

FIG. 7 illustrates one possible implementation of the feedback circuit 6 for offset compensation. The feedback comprises a first transconductance stage Gm1, a second transconductance stage Gm2 and a capacitance Cfb. The input nodes INP and INN are connected to the outputs XL1 and XL2 in the transmitter shown in FIG. 1. The outputs OUTP and OUTN are connected to the connections DACN and DACP. The capacitance is connected between the outputs of the first transconductance Gm1 and the inputs of the second transconductance Gm2. The dominant pole of the arrangement is formed from the quotient of the gradient of the first transconductance stage Gm1 and of the capacitance Cfb.

Figure 8:
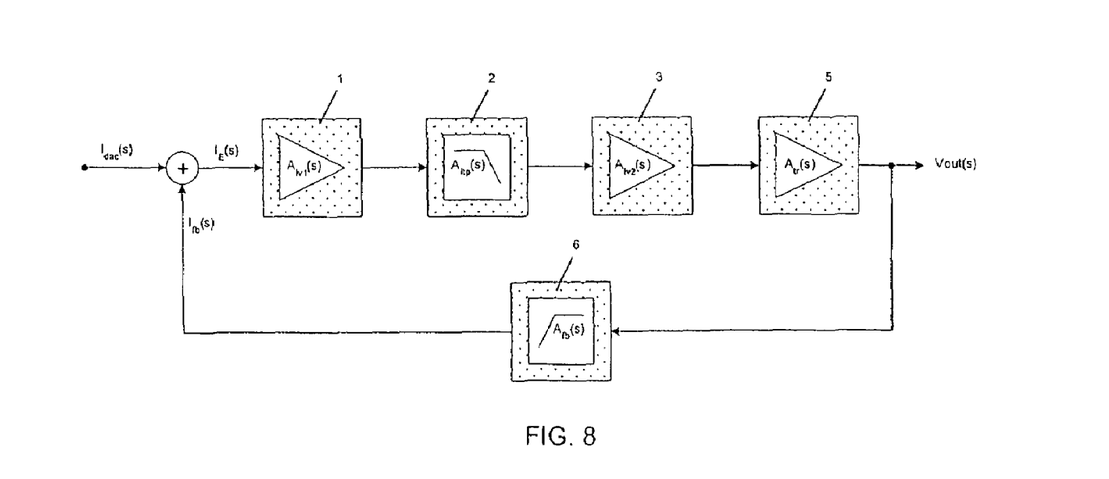
FIG. 8 shows a simple equivalent circuit for calculation of the transmission characteristics in the frequency domain for the transmitter shown in FIG. 1.

FIG. 8 shows a simplified illustration of the transmission chain in the transmitter shown in FIG. 1. The transfer function from the output of the digital/analogue converter to the transmitter output is calculated taking into account the equations mentioned above as follows:

$$G_{TR}(s) = \frac{V_{out}(s)}{i_o(s)} = \frac{H_{fw}(s)}{1 + A_{fb}(s) * H_{fw}(s)} \quad [1.7]$$

and $$H_{fw}(s) = A_{iv1}(s) * A_{irp}(s) * A_{iv2}(s) * A_{tr}(s) =$$

$$\left(N * \frac{1}{1 + \frac{s}{\omega_{iv1}}}\right) * \frac{R1}{R2}\left(\frac{1 + \frac{1}{gm_{N1} * R1}}{1 + \frac{1}{gm_{N2} * R2}}\right)$$

$$\left(\frac{1}{1 + \frac{s}{\omega_{tp}}}\right) * \left(M * \frac{1}{1 + \frac{s}{\omega_{iv2}}}\right) * \left(R_{fb} * \frac{1}{1 + T_{loop}(s)}\right)$$

where
GTR(s) is the transfer function in the frequency domain of the entire transmitter,
Hfw(s) is the forward gain of the arrangement,
Afb(s) is the transfer function in the frequency domain of the feedback for offset compensation,
$\omega_{iv1}$ is the pole frequency of the parasitic pole of the amplifier stage 8 shown in FIG. 1,
$\omega_{iv2}$ is the pole frequency of the parasitic pole of the amplifier stage 3 shown in FIG. 1, and
Atr(s) is the transfer function in the frequency domain of the shunt-shunt feedback 5 shown in FIG. 1.

The following relationship can be quoted, in simplified form, as the reference point for the harmonic distortion that is to be expected inside the transmitter:

$$HD_2 \cong \frac{1}{8} * \frac{I_{AC}}{I_{DC}} * \frac{\omega}{gm_{Nx}/C_{InNx}} = \frac{1}{8} * \frac{I_{AC}}{I_{DC}} * \frac{\omega}{\omega_{DP}} \quad [1.8]$$

where
HD2 is the second harmonic of the transmitter,
IAC is the amplitude of the signal current,
IDC is the supply current in the transistor,
$\omega$ is the instantaneous angular frequency of the signal current,
$\omega$DP is the dominant pole in the forward signal path of the transmitter,
gmNx is the gradient of the transistor at which the dominant pole is produced, and
CinNx is the total capacitance of the input or output of the transistor at which the dominant pole is produced.

One major advantage of the invention can be seen from the equation 1.8. The second harmonic distortion HD2 can be chosen optimally by suitable choice of the bandwidth, by reduction of the parasitic mode capacitances, and by a suitable ratio of the signal current to the supply current for operating point adjustment.

The individual components of the transmitter can be designed and implemented independently of the details of the practical implementation, with the aid of the stated equations, and, even if the internal supply voltage is low, they represent a stable and reliable implementation for pulse generation and transmission of data.

LIST OF REFERENCE SYMBOLS

1 Digital/analogue converter
2 Form filter
3 Current amplifier
4 Level shifter
5 Line driver
6 Offset compensation
7 Reference current production
8 Amplifier
9 Low pass filter
10 Transmission line
11 Signal path
12 Feedback path
13 Decoder
14 Current sources
15 Output
20 Current mirror
21 Voltage regulator
22 Current sources
23 Operation amplifier
INN, INP Differential inputs
OUTN, OUTP Differential outputs
N1, N1' Mirror transistors
N2, N2' Mirror transistors
P2, P2' Mirror transistors
P3, P3' Mirror transistors
R1, R1' Degeneration resistors
R2, R2' Degeneration resistors
P1, P1' Transistor
N3, N3' Cascode transistor
VDD1 Low operating voltage
VDD2 High operating voltage
RL Line resistance

The invention claimed is:

1. A transmitter for transmission of digital data via a transmission line, comprising
a digital/analog converter configured to operate in current mode, the digital/analog converter operably coupled to an input of the transmitter;
a form filter for forming current pulses received from the digital/analog converter, the form filter including at least one current mirror and a voltage regulator configured to stabilize a signal input of the at least one current mirror;
a line driver operably coupled downstream from the form filter, the line driver configured to carry out current/voltage conversion; and
an offset compensation circuit.

2. The transmitter of claim 1, further comprising a current-operated amplifier connected between the form filter and the digital/analog converter.

3. The transmitter of claim 2, wherein the amplifier comprises a current mirror.

4. The transmitter of claim 1, wherein the form filter comprises a low-pass filter.

5. The transmitter of claim 4, wherein the low-pass filter includes has a current mirror.

6. The transmitter of claim 1, wherein the form filter is configured to pre-emphasize pulses in accordance with a predefined standard.

7. The transmitter of claim 6, wherein the cut-off frequency of the low-pass filter is switchable.

8. The transmitter of claim 1, further comprising a current-controlled current amplifier operably coupled in the signal path of the transmitter.

9. The transmitter of claim 8, wherein the current-controlled current amplifier comprises a current mirror.

10. The transmitter of claim 9, wherein the current-controlled current amplifier further comprises a voltage regulator configured to stabilize the signal voltage of the current mirror of the current-controlled current amplifier.

11. The transmitter of claim 1, further comprising a current-controlled level shifter operably coupled in the signal path of the transmitter, the level shifter configured to convert a lower supply voltage to a higher supply voltage.

12. The transmitter of claim 11, wherein the level shifter comprises a current mirror.

13. The transmitter of claim 12, wherein the level shifter further comprises a voltage regulator configured to stabilize the signal voltage of the current mirror of the level shifter.

14. The transmitter of claim 1, wherein the circuit for offset compensation is formed from transconductance stages.

15. The transmitter of claim 1, wherein the circuit for offset compensation includes a low-pass filter characteristic.

16. The transmitter of claim 1, wherein the offset compensation circuit is operably coupled in a feedback path of the transmitter.

17. A transmitter for transmission of digital data via a transmission line, comprising:
a digital/analog converter configured to operate in current mode, the digital/analog converter operably coupled to an input of the transmitter;
a form filter for forming current pulses received from the digital/analog converter, the form filter including a current mirror and a voltage regulator configured to stabilize a signal input of the current mirror;
a current-controlled current amplifier operably coupled in the signal path of the transmitter, the current-controlled current amplifier comprising a current mirror and a voltage regulator configured to stabilize a signal voltage of the current mirror;
a level shifter operably coupled in the signal path of the transmitter, the level shifter configured to convert a lower supply voltage to a higher supply voltage, the level shifter comprising a current mirror and a voltage regulator configured to stabilize a signal voltage of the current mirror; and
a line driver operably coupled downstream from the form filter, the line driver configured to carry out current/voltage conversion.

18. The transmitter of claim 17 wherein the form filter further comprises a low pass filter.

19. The transmitter of claim 18 wherein the low pass filter further comprises a current mirror.

20. The transmitter of claim 17 further comprising at least one current mirror coupled between the form filter and the line driver.

21. A transmitter for transmission of digital data via a transmission line, comprising
a digital/analog converter configured to operate in current mode, the digital/analog converter operably coupled to an input of the transmitter;
a form filter for forming current pulses received from the digital/analog converter, the form filter including a current mirror, the form filter including a current-operated low pass filter and a current-operated amplifier connected between the low pass filter and the digital/analog converter;
a line driver operably coupled downstream from the form filter, the line driver configured to carry out current/voltage conversion; and
a reference current production device configured to provide a reference current to the digital/analog converter, the form filter and the line driver;
an offset compensation circuit operably coupled to the line driver.

22. The transmitter of claim 21, wherein the offset compensation circuit is operably coupled to receive an output of the line driver.

23. The transmitter of claim 21, wherein the offset compensation is configured to provide at least some compensation for a DC offset of the line driver.

24. The transmitter of claim 21, wherein the offset compensation circuit is operably coupled in a feedback path of the transmitter.

25. The transmitter of claim 21, wherein the form filter further comprises a voltage regulator configured to stabilize the signal voltage of the current mirror of the form filter.

* * * * *

UNITED STATES PATENT AND TRADEMARK OFFICE
CERTIFICATE OF CORRECTION

PATENT NO. : 7,450,649 B2
APPLICATION NO. : 10/481856
DATED : November 11, 2008
INVENTOR(S) : Gregorius et al.

Page 1 of 1

It is certified that error appears in the above-identified patent and that said Letters Patent is hereby corrected as shown below:

On the Title Page

Item (22) PCT Filed: replace "May 15, 2003" with --May 15, 2002--

Signed and Sealed this

Eighth Day of September, 2009

David J. Kappos
*Director of the United States Patent and Trademark Office*